March 27, 1962 A. B. CUNNINGHAM 3,026,827
PLANT WATERING AND FEEDING DEVICE
Filed Dec. 6, 1960
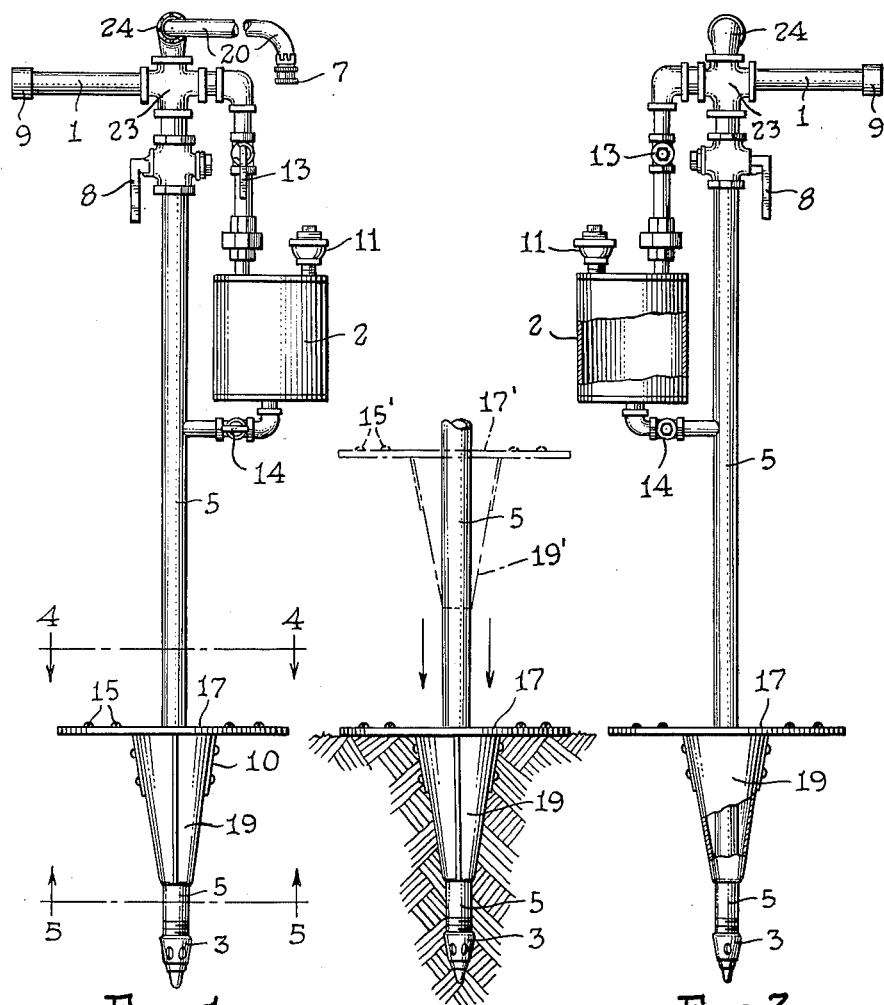
Fig. 1. Fig. 2. Fig. 3.
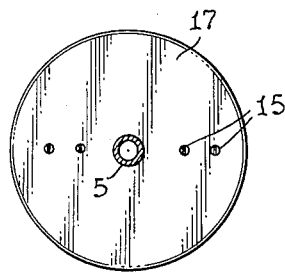 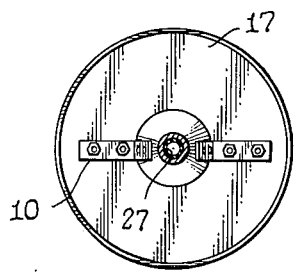
Fig. 4. Fig. 5.
INVENTOR
A. B. CUNNINGHAM

United States Patent Office 3,026,827
Patented Mar. 27, 1962

3,026,827
PLANT WATERING AND FEEDING DEVICE
Arthur B. Cunningham, 1438 Morris Road SE.,
Washington, D.C.
Filed Dec. 6, 1960, Ser. No. 75,075
3 Claims. (Cl. 111—7.1)

The present invention relates to a plant watering and feeding device.

It is an object of the present invention to provide a device by means of which trees and other plants can be watered and/or fed with a plant nutrient.

It is another object of the present invention to provide a plant watering and feeding device which is easily connectable to a readily available source of water under pressure, by means of which device the water and, if desired, plant food can be introduced into the ground.

It is still another object of the present invention to provide a plant watering and feeding device by means of which water and/or plant food can be introduced at any desired depth, and wherein means are provided for preventing the escape of water and/or plant food that is thus introduced.

The objects of the present invention also include the provision of a plant watering and feeding device which can readily be used under many different conditions, such as in uneven or broken terrain, on hillsides and terraces, as well as in indoor plant beds, pots, boxes, greenhouses, and other restricted areas which normally are not watered by natural sources.

A further object of the present invention is the provision of a plant watering and feeding device which is constructed of simple parts, which can be built and mass-produced at low cost, which is rugged, and which will give long periods of trouble-free service.

Additional objects and advantages of the present invention will become apparent upon consideration of the following description when taken in conjunction with the accompanying drawings, in which:

FIGURE 1 is a front elevational view of a plant watering and feeding device according to the present invention.

FIGURE 2 is a fragmentary front elevational view showing the adjustability of one of the parts to be described.

FIGURE 3 is a rear elevational view of the plant watering and feeding device, the container for the plant food and the water retaining device being shown partly in section.

FIGURE 4 is a sectional view taken along line 4—4 of FIGURE 1.

FIGURE 5 is a sectional view taken along line 5—5 of FIGURE 1.

Referring now to the drawings, there is shown a plant watering and feeding device comprising an elongated hollow water stem 5 having at its upper end an inlet formed as a nipple 24 which is connectable to a hose 20, the latter carrying at its right-hand end, as viewed in FIGURE 1, a threaded attachment ring 7 which enables the hose to be connected to a source of water under pressure as, for example, a mobile tank or a conventionally threaded water faucet (not shown). The bottom end of the watering stem 5, which forms the outlet end, is threaded and carries a conical perforated tip 3.

Intermediate the inlet and outlet ends of the watering stem is a conventional valve 8 which controls the flow of water through the stem 5. The device further includes a plant food container 2 having a charging inlet 11. One conduit incorporating a valve 13 places the top of the plant food container 2 in communication with the stem 5 at a point intermediate the valve 8 and the inlet end, and another conduit incorporating a valve 14 places the bottom of the container 2 in communication with the stem 5 at a point intermediate the valve 8 and the outlet end. As is shown in FIGURES 1 and 3, the conduit incorporating the valve 13 is threaded into one opening of a cross-type fitting 23, the top of the stem 5 and the part forming the nipple 24 are threaded into two further openings, and a handle 1, which facilitates manipulation of the device, is threaded into the remaining opening. The handle may be constituted by a short pipe section which is capped at 9.

The lower outlet end of the stem 5 is adapted to be inserted into the ground to any preselected depth and, in accordance with the present invention, means are provided for preventing the escape of water coming out of the outlet end. These means are constituted by a disk-shaped water retaining plate 17 which is mounted on the stem 5, the position of this plate 17 being adjustable along the length of the stem 5. The plate 17 carries on that side thereof which faces the outlet end of the stem 5 a tapering conical member 19 which is secured to the plate 17 by means of angle brackets 10 that are suitably secured to the parts 17 and 19, such as by screws 15. It will be understood, however, that other fastening means, such as rivets, welded or soldered joints, etc., may be used. The water retaining plate 17 and the conical member 19 move together as a unit so that the position of this unit is adjustable, depending on the depth to which the outlet end of the stem 5 is driven into the ground. Thus, if the stem is driven deeper, as shown by the arrows in FIGURE 2, the unit 17, 19 will occupy the position shown in FIGURE 2 in dotted lines.

The unit 17, 19 is provided with one or more rubber sealing gaskets 27, as shown in FIGURE 5, which will ensure the fluid-tightness.

It will be appreciated that the outlet end of the stem 5 may be placed in the position in which the needs of the particular situation are served best, so that the plant is watered and fed with optimum efficiency. Thanks to the water retaining plate 17, as well as the conical member 19, the escape of water and/or plant food introduced through the outlet end of the stem 5 is prevented. This eliminates waste of time, as well as loss of water and plant nutrients, the latter often being expensive.

Water and plant food, such as a fertilizer, may be fed as follows: If it is desired merely to water the plant, the valves 13 and 14 are closed and the valve 8 is opened, so that water may flow directly from the inlet of the stem 5 down through the interior of the stem and to the outlet end. If, however, it is desired to send plant food stored in the container 2 down through the outlet of the stem 5, the valve 8 is closed and the valves 13 and 14 are opened. As a result, water entering the inlet of the stem 5 will be forced to flow through the interior of the container 2 and thus carry along the plant food stored therein. The plant food may be liquid, but it may also be in finely divided solid form, so that the diameter of the conduits and stem, as well as the perforations of the tip 3, should be sufficiently large to allow the plant food to pass through.

It will be understood that the above description of the present invention is susceptible to various modifications, changes and adaptations, and the same are intended to be comprehended within the meaning and range of equivalents of the appended claims.

I claim:

1. A plant watering and feeding device comprising, in combination: an elongated hollow water stem having at one end thereof an outlet and at the other end thereof an inlet connectable to a source of water; a first valve carried by said water stem and arranged between said inlet and outlet ends thereof; a plant food container; a first conduit placing the upper end of said plant food container in direct communication with said watering stem at a point intermediate said inlet end and said first valve; a second valve arranged in said first conduit; a second conduit placing said plant food container in communication with said watering stem at a point intermediate said first valve and said outlet end; a third valve arranged in said second conduit; and a water retaining plate mounted on said stem and being adjustable along the length thereof, whereby water and plant food, as desired, may be introduced into the ground by inserting said outlet end of said watering stem into the ground to any preselected depth and by positioning said water retaining plate along the length of said watering stem until said plate engages the surface of the ground, thereby preventing the escape of water and plant food introduced into the ground through said watering stem.

2. A plant watering and feeding device as defined in claim 1 wherein said water retaining plate carries on that side thereof which faces said outlet end of said watering stem a tapering conical member, said watering plate and said conical member being movable together as a unit along said watering stem.

3. A plant watering and feeding device as defined in claim 2, further comprising a handle secured to said watering stem in the region of said inlet end thereof.

References Cited in the file of this patent

UNITED STATES PATENTS

| | | |
|---|---|---|
| 1,964,064 | Karshner | June 26, 1934 |
| 2,242,789 | McFee | May 20, 1941 |

FOREIGN PATENTS

| | | |
|---|---|---|
| 777,103 | France | Nov. 17, 1934 |
| 952,341 | France | May 2, 1949 |